Nov. 24, 1959     P. D. BECKER     2,913,952
PIERCING FASTENER WITH DEFORMABLE HEAD AND EXPANDING LEGS
Filed Aug. 29, 1955
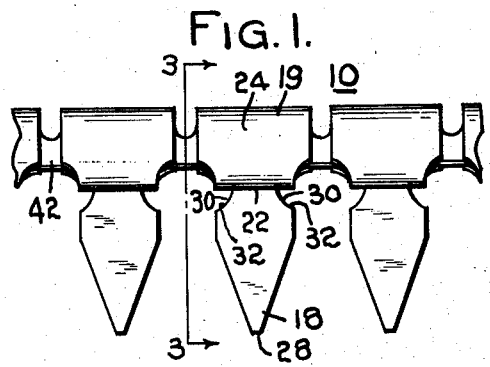
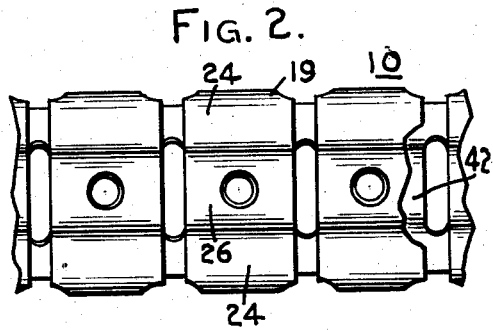
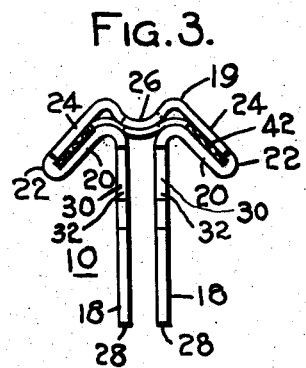
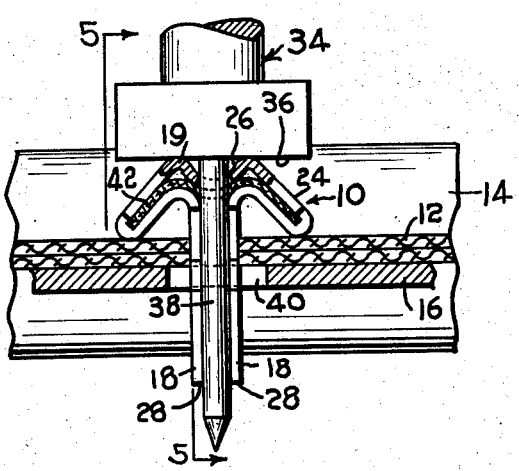
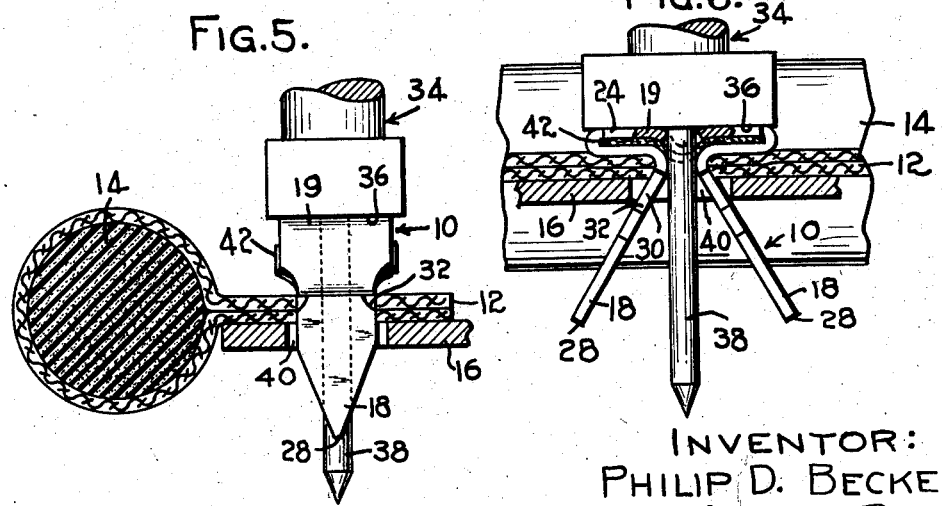
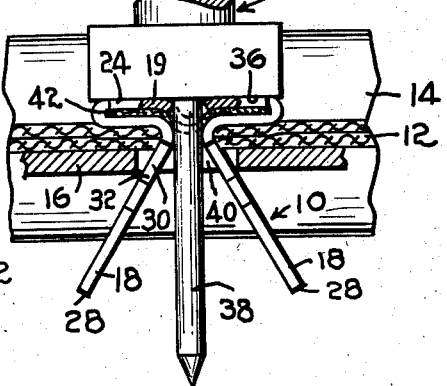
INVENTOR:
PHILIP D. BECKER,
BY Robert E. Ross
ATTORNEY.

United States Patent Office 2,913,952
Patented Nov. 24, 1959

2,913,952

PIERCING FASTENER WITH DEFORMABLE HEAD AND EXPANDING LEGS

Philip D. Becker, Hingham, Mass., assignor to United-Carr Fastener Corporation, Boston, Mass., a corporation of Delaware Application August 29, 1955, Serial No. 530,982

1 Claim. (Cl. 85—38)

This invention relates generally to fastening devices and has particular reference to a fastener adapted to pierce a fibrous or plastic layer and enter an aperture in a support panel superimposed thereon.

In the construction of automobiles, appliances and the like, it is necessary to attach various types of fibrous or plastic materials to an apertured support panel. For example, a material known as wind cord is fitted about the doors of automobiles to provide a weather-tight seal. In many cases such attachment must be made without access to the rear of the panel and is usually desirable that the fastener be capable of piercing the plastic or fibrous layer so that preformed apertures need not be provided.

The object of the invention is to provide a fastener to suit the above requirements which is particularly adapted for assembly onto a carrying tape.

A further object of the invention is to provide a fastener for the purpose described which is so constructed as to lock in place by arms which spread in response to deformation of the head of the fastener.

Other objects of the invention will, in part, be obvious, and will, in part, appear hereinafter.

In the drawing:

Fig. 1 is a view in side elevation of a fastener assembly embodying the features of the invention;

Fig. 2 is a top plan view of the fastener assembly of Fig. 1;

Fig. 3 is a view in section taken on line 3—3 of Fig. 1;

Fig. 4 is a view in elevation partly in section showing the first step of attaching a wind cord to a support panel by means of a fastener of Fig. 1;

Fig. 5 is a view in section taken on line 5—5 of Fig. 4; and

Fig. 6 is a view of the assembly of Fig. 4 after deformation of the head has caused the arms to spread to lock the fastener in place.

Referring to the drawing, there is illustrated a fastener 10 which is adapted for attaching a plastic or fibre layer, such as the flange 12 of a wind cord 14 or the like to an apertured support 16.

In the preferred embodiment the fastener 10 is made of a single strip of material such as sheet metal and is formed to provide a pair of colateral spaced legs 18 with a head 19 formed by downwardly and outwardly inclined portions 20 extending from the upper ends thereof to a reverse bend portion 22 with a connecting portion 24 extending above the downwardly inclined portions joining the reverse bend portions. In the illustrated embodiment the medial portion 26 of the connecting portion is dished inwardly between the upper ends of the legs and is provided with a central aperture 27 so as to weaken the medial portion and to receive an assembly tool as will appear hereinafter.

The legs 18 are each provided with a sharp piercing point 28 for self-piercing the flange 12, and a neck 30 spaced from the ends of the leg forming a pair of shoulders 32. In the illustrated embodiment the neck 30 is substantially in the same plane as the outer ends of the downwardly inclined leg portions 20.

The fastener 10 may be assembled with the wind cord and support panel by means of a tool 34 which has a seat 36 against which the head 19 rests and a guide pin 38 extending therefrom beyond the ends of the legs.

Since the aperture 40 in the panel is concealed behind the flange 12, the pin 38 protruding beyond the ends of the legs enables the aperture 40 to be located so that when the tool is forced toward the panel the legs will pierce the flange and enter the support aperture.

Thereafter the fastener may be locked in place by forcing the tool further toward the panel whereby the outer ends of the downwardly inclined portions, in contacting the surface of the flange, cause the center of the head to be deformed downwardly. The downward deformation of the inclined portions 20 causes outward movement of the legs 18 so that the neck portions 30 move to opposite portions of the aperture and the shoulders 22 lock behind the adjacent edges of the panel. During such deformation the inwardly dished medial portion 26 of the connecting portion backs up the upper ends of the legs and assists in imparting uniform outward movement to each leg.

The proportions of the fastener in relation to the size of the opening are such that when the legs are spread they bear against the sides of the opening before the head portion is fully flattened so that further deformation of the head forces the legs tightly against said edges insuring a secure attachment and also provides means for accommodating slight variations in hole size and thickness of the assembly.

The neck portion 30 enables the legs 18 to spread apart far enough for the shoulders 32 to pass behind the edges of the opening and lock the fastener in place.

As illustrated in Figs. 1 through 3, the fastener 10 is adapted for assembly onto a carrying tape 42 which may be formed of paper, cloth or other material strong enough to retain a group of fasteners yet readily shearable to separate a fastener to be driven.

The tape 42 is best assembled with the fasteners during the manufacture of the fasteners by folding the portions of the head about the edges of the tape so that the connecting portion 24 extends transversely over the top of the tape and the legs 18 project from the lower side thereof with the connecting portion and the inclined portions 20 gripping the tape to retain it in position therein in proper spaced relation to the adjacent fasteners. When the fastener is attached to the wind cord and support, the tape may be severed either by hand or automatically by a blade (not shown) secured to the attaching tool.

Although in the illustrated embodiment the fastener is used for securing wind cord, it may be utilized in any application where it is desired to rapidly and economically attach a fibre or plastic panel to an apertured support.

Since certain other obvious modifications may be made in this device without departing from the scope of the invention, it is intended that all matter contained herein be interpreted in an illustrative and not in a limiting sense.

I claim:

A one-piece sheet metal fastening device for piercing a layer of fibrous material and engaging in an aperture of a panel superimposed thereon comprising an elongated strip of sheet metal material of rectangular cross section and transversely bent to provide a pair of co-lateral legs disposed in spaced, substantially parallel face to face relation, the side edges of each of said legs being inwardly inclined forming a pointed end, indented edge portions disposed in spaced relation to the pointed end forming a narrowed neck portion and upwardly facing shoulders, and a head member adjoining said indented edge portions and including wing portions extending outwardly and downwardly from the upper end of each of said legs to a reverse bend portion approximately opposite the neck portion of each leg, said head member including a top portion disposed above each of said downwardly inclined wing portions and substantially parallel thereto and connecting said reverse bend portions of said head, said top portion having an apertured, inwardly dished, medial portion adjacent the upper ends of said legs and adapted to receive an assembly tool therein, said apertured, dished, medial portion being responsive to downward forces to deform same to back up the upper ends of said legs and aid in the uniform outward movement of said legs during the assembly of the fastener to a panel.

References Cited in the file of this patent

UNITED STATES PATENTS

| | | |
|---|---|---|
| 212,353 | Card | Feb. 18, 1879 |
| 964,226 | Farrand | July 12, 1910 |
| 2,128,005 | Lombard | Aug. 23, 1938 |
| 2,173,198 | Churchill | Sept. 19, 1939 |
| 2,232,994 | Bernstein | Feb. 25, 1941 |
| 2,566,062 | Jaeger | Aug. 28, 1951 |
| 2,611,166 | Wiley | Sept. 23, 1952 |
| 2,649,883 | Sharp | Aug. 25, 1953 |